US012682927B1

(12) United States Patent
Xu et al.

(10) Patent No.: US 12,682,927 B1
(45) Date of Patent: Jul. 14, 2026

(54) METHODS FOR DYNAMIC SERVO OPTIMIZATION BASED ON TAPE POSITION

(71) Applicant: Western Digital Technologies, Inc., San Jose, CA (US)

(72) Inventors: Erxiang Xu, Fujisawa (JP); Takehiko Hamaguchi, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/244,829

(22) Filed: Jun. 20, 2025

(51) Int. Cl.
*G11B 5/588* (2006.01)

(52) U.S. Cl.
CPC ..................................... *G11B 5/588* (2013.01)

(58) Field of Classification Search
None
See application file for complete search history.

(56) References Cited

U.S. PATENT DOCUMENTS

| | | | |
|---|---|---|---|
| 4,531,166 | A | 7/1985 | Anderson |
| 6,940,683 | B2 | 9/2005 | Berman et al. |
| 7,054,093 | B1 | 5/2006 | Anderson et al. |
| 7,876,521 | B2 | 1/2011 | Cherubini et al. |
| 8,947,821 | B1 * | 2/2015 | Blinick ................ G11B 5/5926 |
| | | | 360/77.08 |
| 8,982,493 | B2 | 3/2015 | Underkofler |
| 9,324,348 | B2 * | 4/2016 | Blinick .............. G11B 20/1201 |
| 11,138,996 | B1 * | 10/2021 | Galbraith ........... G11B 5/00817 |
| 11,532,325 | B1 * | 12/2022 | Le ........................ G11B 5/5504 |
| 11,776,569 | B1 * | 10/2023 | Biskeborn .......... G11B 5/59688 |
| | | | 360/77.12 |
| 2002/0021514 | A1 * | 2/2002 | Bui ........................ G11B 5/584 |
| 2002/0181143 | A1 * | 12/2002 | Winarski ................. G11B 5/29 |
| 2005/0122623 | A1 * | 6/2005 | Dee ...................... G11B 5/0083 |
| 2005/0174681 | A1 * | 8/2005 | Berman ................. G11B 5/584 |
| 2005/0254161 | A1 * | 11/2005 | Nakao .................. G11B 15/026 |

(Continued)

OTHER PUBLICATIONS

Kinney, Charles E. et al., "A Significant Improvement to Tape Drive PES by Canceling LTM with a Robust, High Performance Controller", Joint Conference on Micromechatronics for Information and Precision Equipment, 2009, pp. 1-2, <http://maeresearch.ucsd.edu/groups/callafon/publications/2009/SVC-06.pdf>.

(Continued)

*Primary Examiner* — Fred Tzeng
(74) *Attorney, Agent, or Firm* — Patterson + Sheridan, LLP

(57) ABSTRACT

The present disclosure is generally related to a tape drive comprising a tape and a tape head. The tape drive comprises a processor configured to perform a disturbance profile identification detecting one or more disturbances along a length of a tape. The disturbance profile identification is used to create a peak filter array, which is used to instruct the piezoelectric and/or voice coil motor actuators to move the tape head to adjust a frequency of the disturbances. The peak filter array is further used to partition the tape into a plurality of zones based on a size of the peak filter array. Servo parameters of a servo head are then updated based on the peak filter array within each zone to adjust the control strategy specific to each zone. Utilizing the disturbance profile identification prevents track following capability loss against the dynamic lateral tape motion of the tape drive.

23 Claims, 12 Drawing Sheets

(56)        References Cited

U.S. PATENT DOCUMENTS

| | | | | |
|---|---|---|---|---|
| 2005/0259349 A1* | 11/2005 | Koski | ................... | G11B 5/584 |
| 2006/0126212 A1* | 6/2006 | Anderson | .......... | G11B 5/00826 |
| 2006/0245104 A1* | 11/2006 | Bui | ..................... | G11B 15/688 |
| 2008/0158720 A1* | 7/2008 | Watson | ............. | G11B 5/00826 |
| | | | | 360/77.12 |
| 2009/0021855 A1* | 1/2009 | Fasen | ................... | G11B 5/584 |
| | | | | 360/71 |
| 2011/0063752 A1* | 3/2011 | Fasen | ................... | G11B 5/584 |
| 2023/0141431 A1 | 5/2023 | Malina et al. | | |

OTHER PUBLICATIONS

Boettcher, Uwe et al., "Dynamic Modeling and Control of a Piezo-Electric Dual-Stage Tape Servo Actuator", IEEE Transactions on Magnetics, vol. 45, No. 7, Jul. 2009, pp. 3017-3024, <https://web.eng.ucsd.edu/mae/groups/callafon/research/publications/2009/IEEETonM1.pdf>.

Jose, Jan et al., "Characterization of lateral tape motion and disturbances in the servo position error signal of a linear tape drive", Tribology International, vol. 38, Issues 6-7, Jun.-Jul. 2005, pp. 625-632, <https://doi.org/10.1016/j.triboint.2005.01.011>.

Argumedo, A. J. et al., "Scaling tape-recording areal densities to 100 Gb/in2", IBM, vol. 52, No. 4/5, Jul./Sep. 2008, pp. 513-527, <https://ieeexplore.ieee.org/abstract/document/5388603>.

* cited by examiner

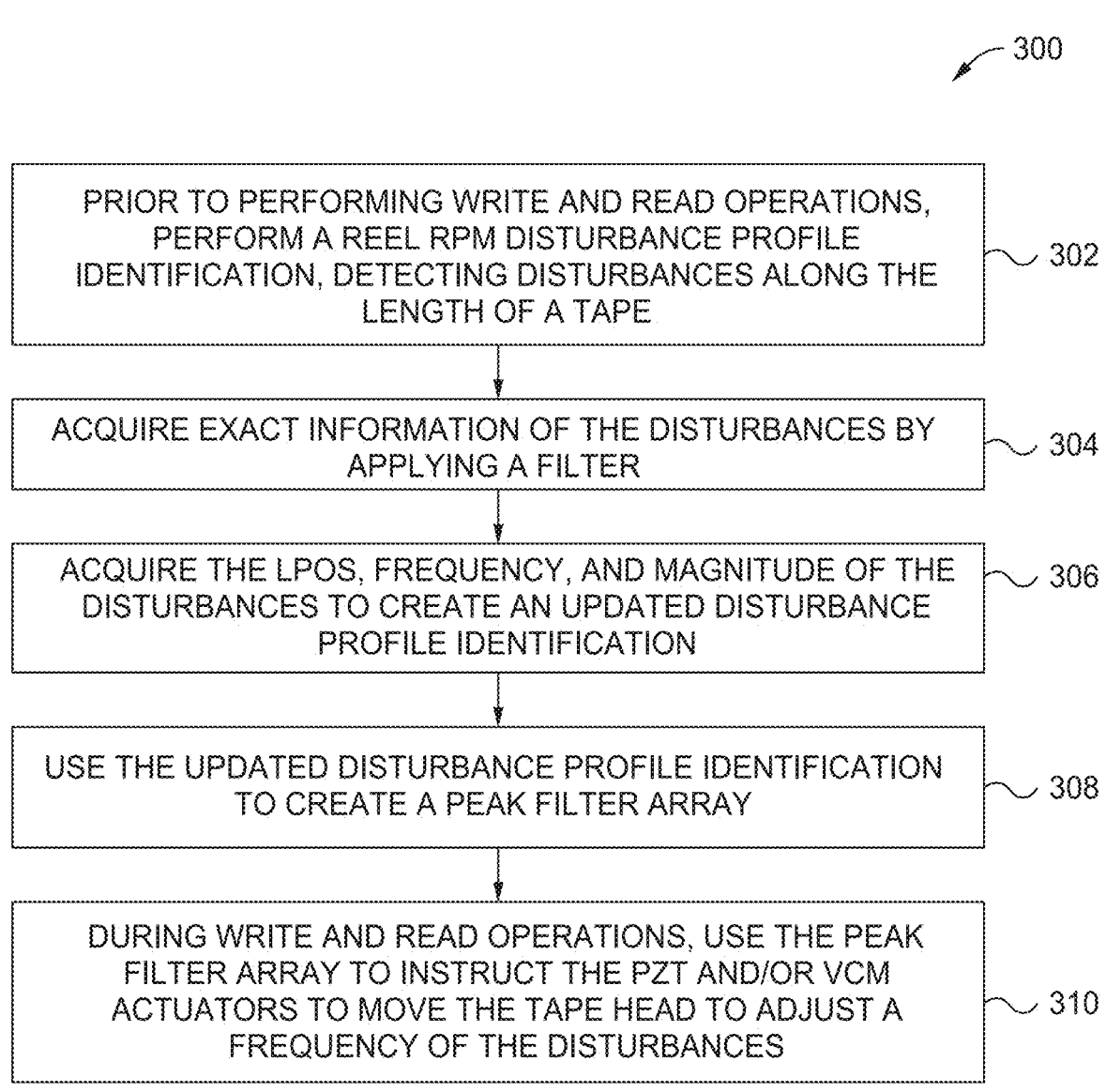

300

PRIOR TO PERFORMING WRITE AND READ OPERATIONS, PERFORM A REEL RPM DISTURBANCE PROFILE IDENTIFICATION, DETECTING DISTURBANCES ALONG THE LENGTH OF A TAPE

302

ACQUIRE EXACT INFORMATION OF THE DISTURBANCES BY APPLYING A FILTER

304

ACQUIRE THE LPOS, FREQUENCY, AND MAGNITUDE OF THE DISTURBANCES TO CREATE AN UPDATED DISTURBANCE PROFILE IDENTIFICATION

306

USE THE UPDATED DISTURBANCE PROFILE IDENTIFICATION TO CREATE A PEAK FILTER ARRAY

308

DURING WRITE AND READ OPERATIONS, USE THE PEAK FILTER ARRAY TO INSTRUCT THE PZT AND/OR VCM ACTUATORS TO MOVE THE TAPE HEAD TO ADJUST A FREQUENCY OF THE DISTURBANCES

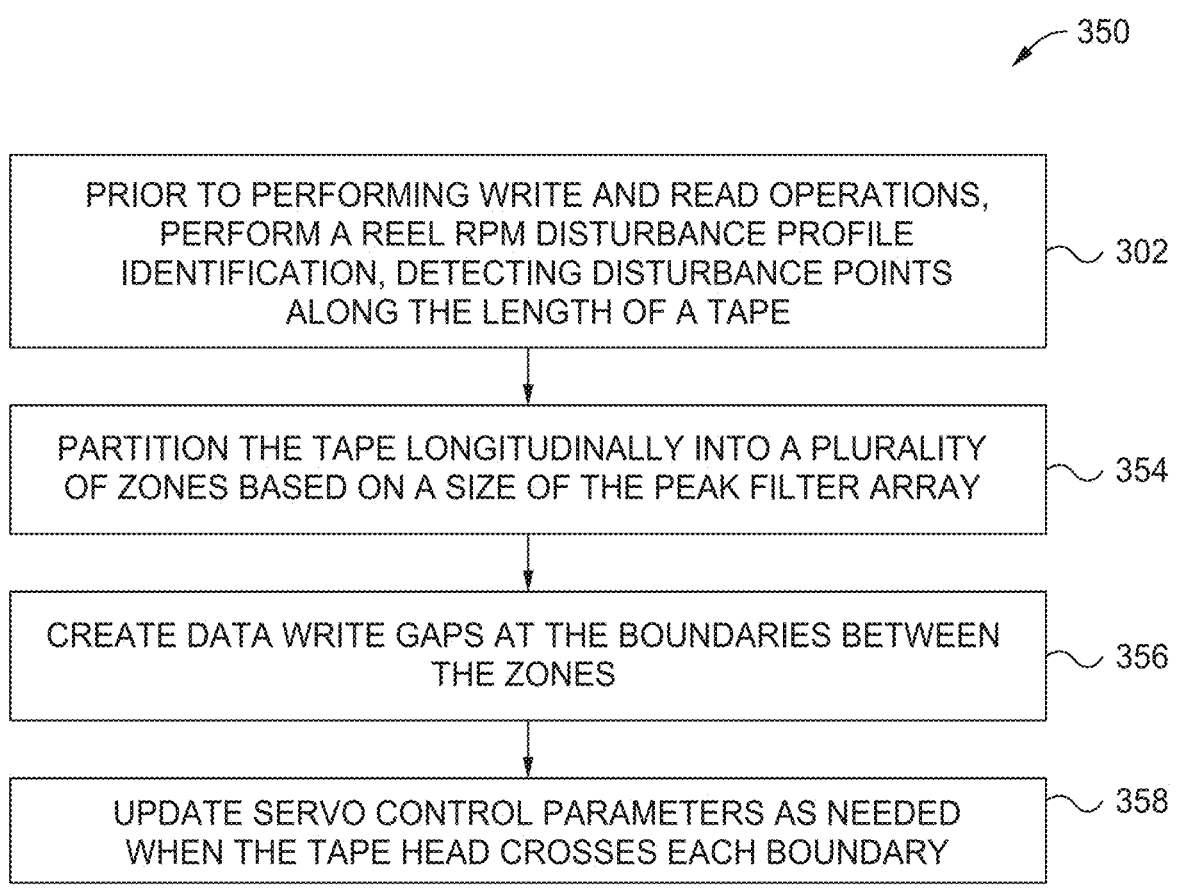

350

PRIOR TO PERFORMING WRITE AND READ OPERATIONS, PERFORM A REEL RPM DISTURBANCE PROFILE IDENTIFICATION, DETECTING DISTURBANCE POINTS ALONG THE LENGTH OF A TAPE

302

PARTITION THE TAPE LONGITUDINALLY INTO A PLURALITY OF ZONES BASED ON A SIZE OF THE PEAK FILTER ARRAY

354

CREATE DATA WRITE GAPS AT THE BOUNDARIES BETWEEN THE ZONES

356

UPDATE SERVO CONTROL PARAMETERS AS NEEDED WHEN THE TAPE HEAD CROSSES EACH BOUNDARY

METHODS FOR DYNAMIC SERVO OPTIMIZATION BASED ON TAPE POSITION

BACKGROUND OF THE DISCLOSURE

Field of the Disclosure

Embodiments of the present disclosure generally relate to a tape head module assembly and a tape drive including the tape head module assembly.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

As data is written to and read from a magnetic tape, the magnetic tape moves back and forth between a cartridge reel and a take-up reel. However, the angular speed or rotations per minute (RPM) of the two reels is constantly changing during read and write operations, causing dynamic lateral tape motion (LTM) along the magnetic tape. The LTM introduces dynamic disturbances along the tape in both magnitude and frequency directions. As such, the tape head struggles to accurately read and write data.

Therefore, there is a need in the art for a tape drive able to adjust its control strategy according to dynamic LTM.

SUMMARY OF THE DISCLOSURE

The present disclosure is generally related to a tape drive comprising a tape head, the tape drive being configured to read from and/or write to a tape. There are pre-written magnetic patterns on the tape. One or more servo readers will read the patterns and generate read-back signals. A control program is embedded in a SoC/FPGA/CPU to decode the read-back signals and control the head to follow the track. Position Error Signal (PES) is the signal that describes the difference between the head position and the target position, thus the criteria of wellness of head control. As a manufacturing process, the tape drive comprises a processor configured to perform a disturbance profile identification detecting one or more disturbances along a length of a tape in a frequency domain of the PES. The disturbance profile identification is used to create a peak filter array, which is used to instruct the voice coil motor and/or piezoelectric actuators to move the tape head to adjust a disturbance compensation to match a frequency and an amplitude of a disturbance. In some embodiments, the generated filter array is further configured to align with a plurality of tape zones partitioned based on the size of the filter array. Servo parameters in the processor that is used to control a servo head are then updated based on the filter array within each zone to change the tape head control strategy specific to each zone. Utilizing the disturbance profile identification helps the tape head track following along the tape that has unique dynamic disturbances.

In one embodiment, a tape drive comprises a take-up reel and a cartridge reel configured to have a tape coupled thereto, a tape head configured to write data to and read data from the tape, a first actuator, a second actuator, the first and second actuators each configured to actuate the tape head, and a processor configured to: perform a reel rotation per minute (RPM) disturbance profile identification detecting one or more disturbances in a frequency domain of position error signal (PES) along a length of a tape, acquire exact information of the disturbance points by applying a filter based on prior information, acquire the longitudinal position (LPOS), frequency, and magnitude of the one or more disturbances to create an updated disturbance profile identification, and use the updated disturbance profile identification to create a peak filter array that will be buffered in a memory device. During write or read operations, the peak filter array is used to assist in instructing one or more of the first actuator and the second actuator to move the tape head to adjust a disturbance compensation to match a frequency and an amplitude of a disturbance during a read or a write operation.

In another embodiment, a tape drive comprises a take-up reel and a cartridge reel configured to have a tape coupled thereto, a tape head configured to write data to and read data from the tape, a first actuator, a second actuator, the first and second actuators each configured to actuate the tape head, and a processor coupled to the tape head, the processor comprising servo controller parameters, wherein the processor is configured to: perform a reel rotation per minute (RPM) disturbance profile identification detecting one or more disturbances along a length of a tape, partition the tape longitudinally into a plurality of zones based on the size of a peak filter array, create data write gaps at the boundaries between each of the zones, and update servo parameters when the tape head crosses each boundary when writing data to or reading data from the tape.

In yet another embodiment, a tape drive comprises a take-up reel and a cartridge reel configured to have a tape coupled thereto, a tape head configured to write data to and read data from the tape, a first actuator, a second actuator, the first and second actuators each configured to actuate the tape head, and a processor coupled to the tape head, the processor comprising controller servo controller parameters, wherein the processor is configured to: perform a reel rotation per minute (RPM) disturbance profile identification detecting one or more disturbances along a length of a tape based on prior information, acquire exact information of the disturbance points by applying a filter, and acquire the longitudinal position (LPOS), frequency, and magnitude of the one or more disturbances to create an updated disturbance profile identification. In some embodiments, the generated filter array is further configured to align with a plurality of tape zones partitioned based on the size of the filter array. the processor is configured to: use the peak filter array to assist in instructing one or more of the first actuator and the second actuator to move the tape head to adjust a disturbance compensation to match a frequency and an amplitude of a disturbance during a read operation or a write operation, partition the tape longitudinally into a plurality of zones based on the peak filter array, create data write gaps at the boundaries between each of the zones, and update the servo parameters when the tape head crosses each boundary when writing data to or reading data from the tape, the updated servo control parameters being based on the peak filter array generate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3B illustrate methods for correcting dynamic lateral tape motion (LTM) in a tape drive, according to embodiments disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape drive comprising a tape and a tape head. The tape drive comprises a processor configured to perform a disturbance profile identification detecting one or more disturbances along a length of a tape. The disturbance profile identification is used to create a peak filter array, which is used to instruct the voice coil motor and/or piezoelectric actuators to move the tape head to adjust a disturbance compensation to match a frequency and an amplitude of a disturbance during a read or a write operation. In some embodiments, the generated filter array is further configured to align with a plurality of tape zones partitioned based on the size of the filter array. Servo parameters of a servo head are then updated based on the peak filter array within each zone to adjust the control strategy specific to each zone. Utilizing the disturbance profile identification prevents a track following capability loss against the dynamic lateral tape motion of the tape drive.

Figure 1A:
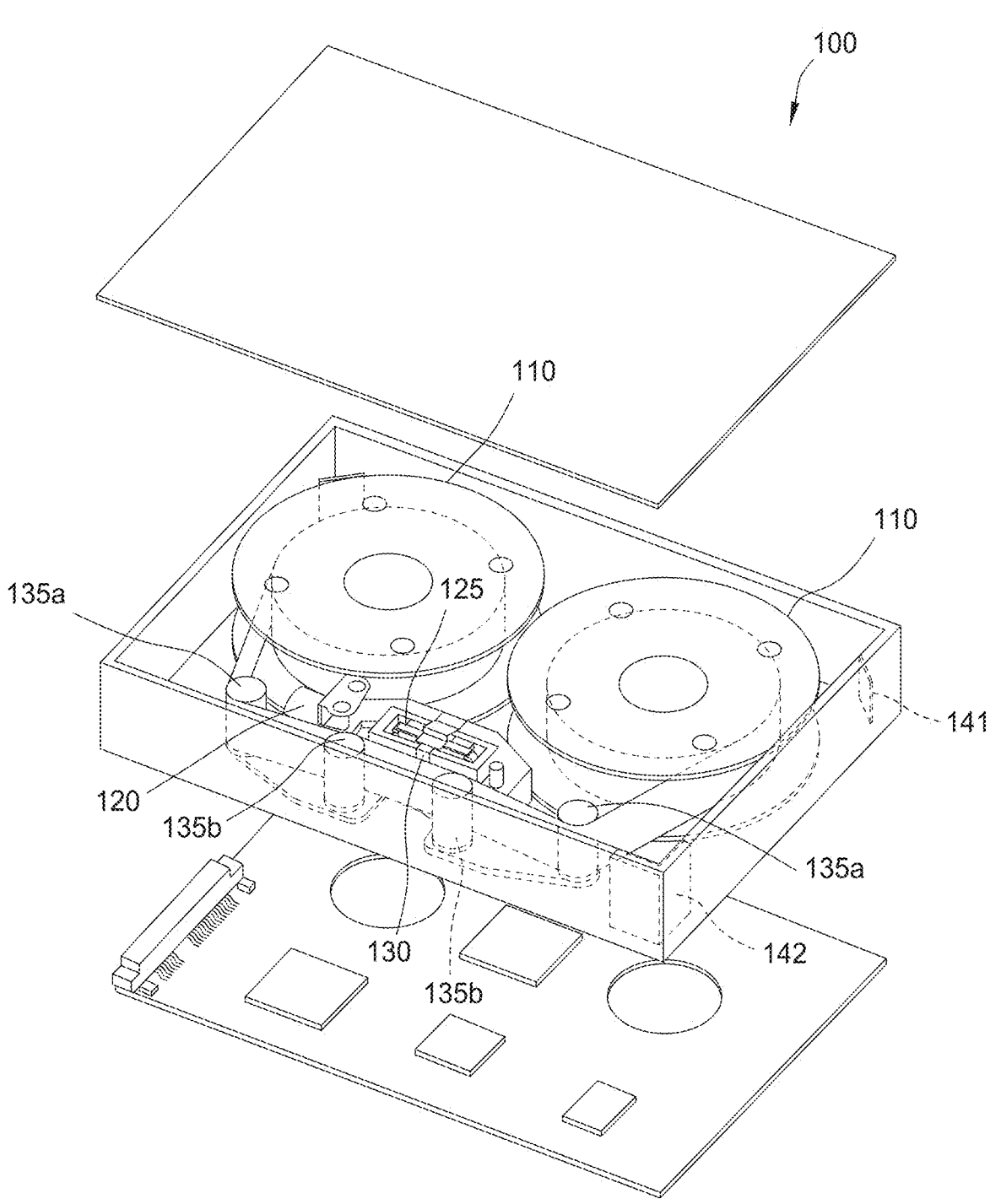
FIGS. 1A-1C illustrate a perspective exploded view, a simplified top down, and side profile view of a tape drive, in accordance with some embodiments.
Figure 1B:
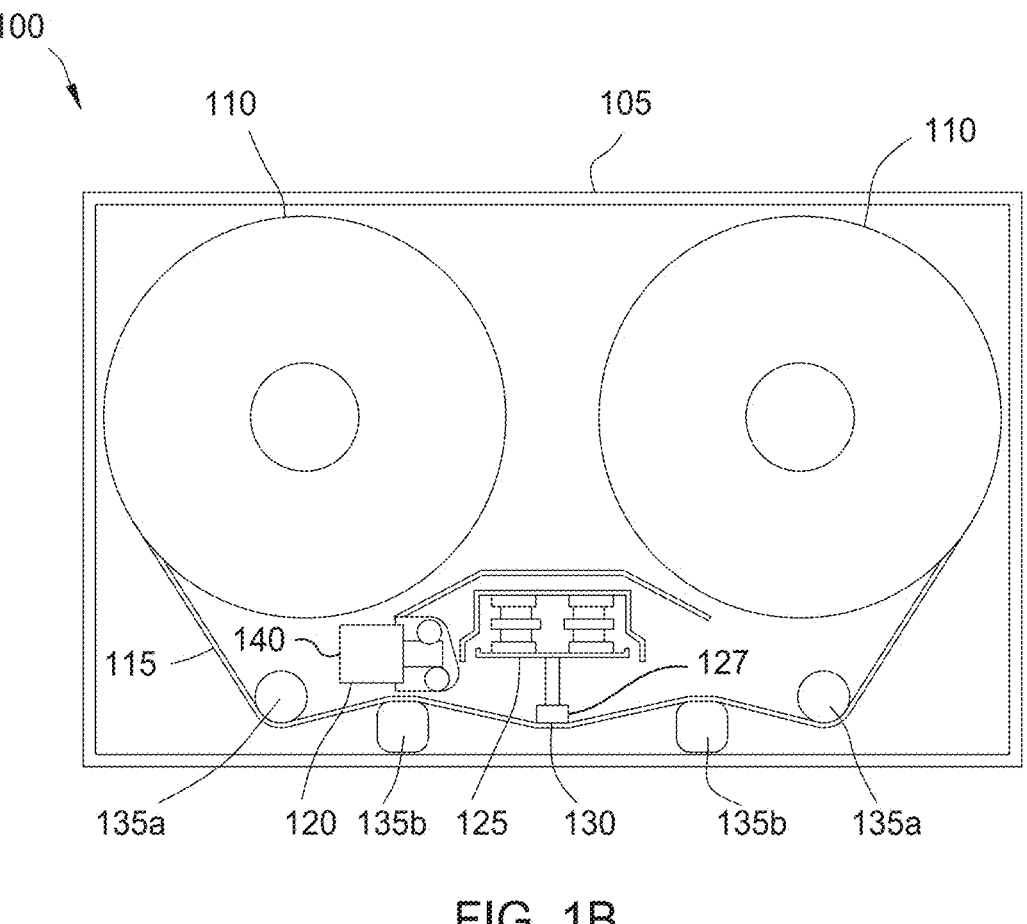
Figure 1C:
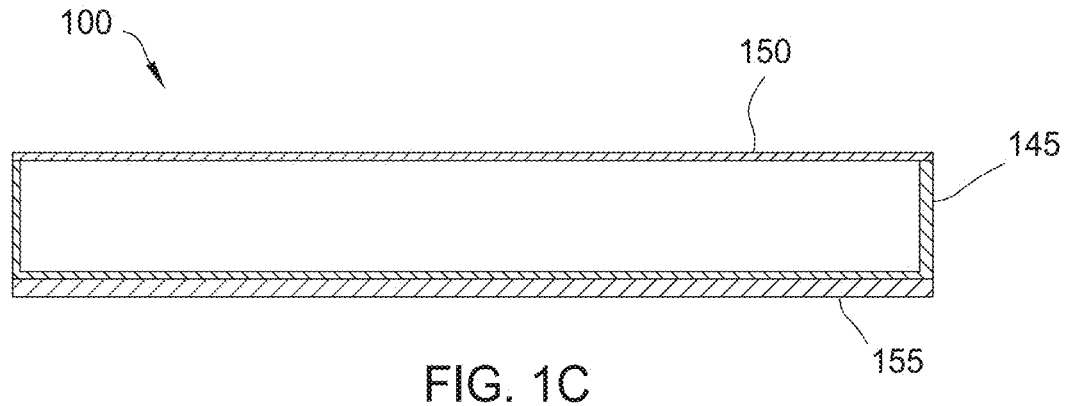

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, a piezoelectric (PZT) actuator 127, a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. For example, one of the reels 110 is a cartridge reel and the other is the take-up reel. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
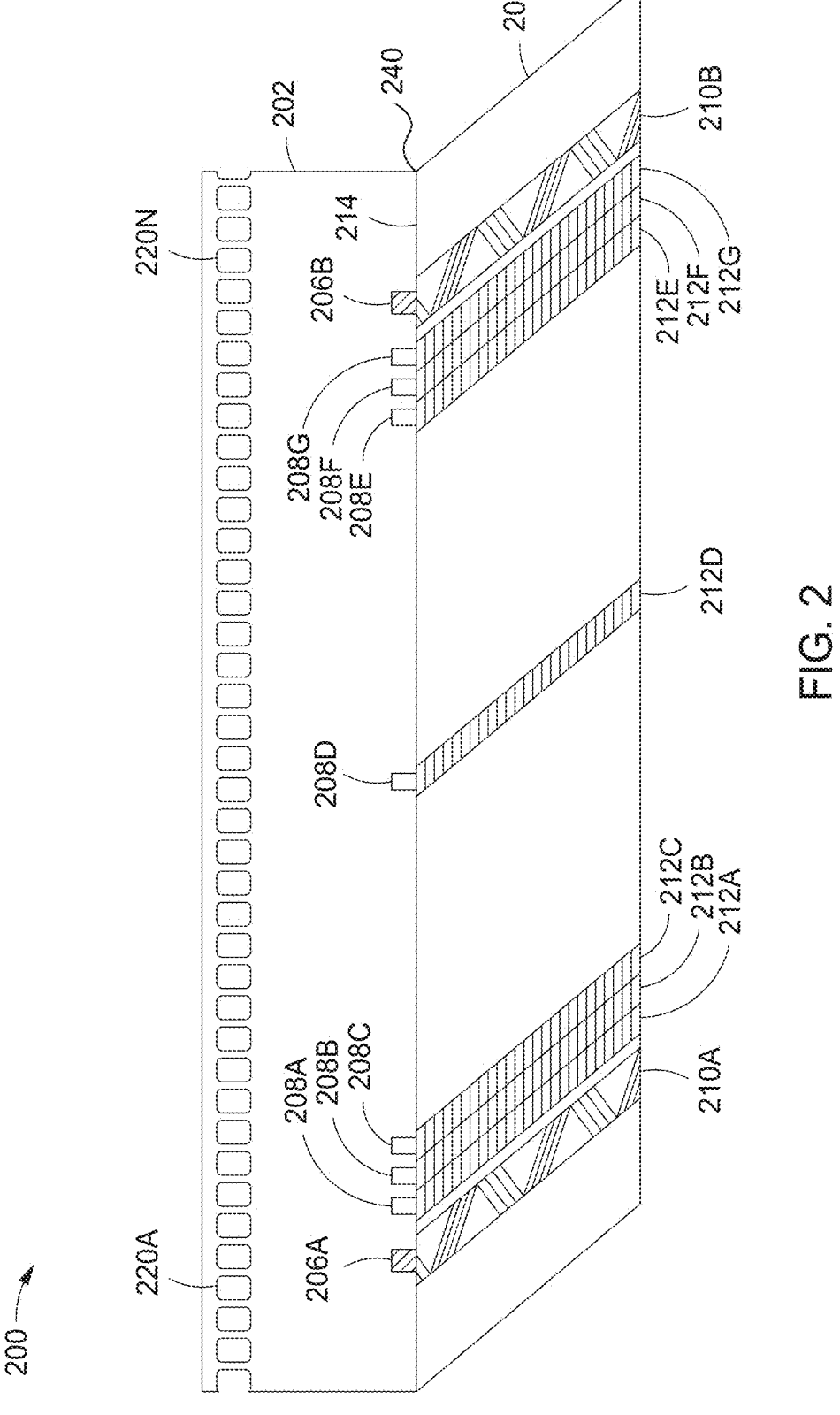
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller 240, which may be the controller 140 of FIGS. 1A-1C.

The tape head body 202 comprises a first servo element pair 206A and a second servo element pair 206B spaced therefrom. It is to be understood that while two servo element pairs have been shown, the disclosure is not limited to two servo element pairs. Rather, it is contemplated that more or less servo element pairs may be present. A plurality of data heads 208A-208G is disposed between the first servo element pair 206A and the second servo element pair 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo element pairs 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-

212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo element pair 206A reads its lateral position information (e.g., alignment) over the first servo track 210A. The second servo element pair 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo element pair 206A, the second servo element pair 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

FIGS. 3A-3B illustrate methods 300, 350 for correcting dynamic lateral tape motion (LTM) in a tape drive, according to embodiments disclosed herein. The methods 300, 350 may be utilized with the tape drive 100 of FIGS. 1A-1C, such as being executed by the controller 140. The methods 300 and 350 may be used in combination with one another.

Method 300 begins at operation 302, where, prior to performing write and read operations, a reel rotation per minute (RPM) disturbance profile identification is performed, where one or more disturbances are detected along a length of a tape (i.e., from a beginning of the tape (BOT) to an end of the tape (EOT)). A position of the tape head and the tape are also decoded from the pre-written servo pattern. Position error signals (PESs) are calculated based on the difference between the position of tape head and the target position. The disturbance information is further identified based on prior or known information, such as reel radius and tape speed. The reel RPM disturbance profile identification may be performed at a factory or in the field, and may be performed numerous times while the tape moves at different speeds. The disturbance information may be stored in a table and are identified in the table by their corresponding longitudinal position (LPOS) along the length of the tape.

At operation 304, a filter is applied to one or more disturbances' frequency to acquire additional information of the disturbances, including frequency and magnitude of the disturbances. The frequency and magnitude of the disturbances are used to calculate new specific servo control parameters, such as a peak filter array. The filter array and the corresponding LPOS of the disturbances are stored in a table. The table may be stored in memory, such as the memory 428 shown in FIG. 4. The servo control parameters may also include tape speed, and tape head tilt, for example. The servo parameters are calculated in a factory setting in one embodiment, but may be calculated or updated in the field as needed.

At operation 306, the LPOS, frequency, and magnitude of the disturbances are acquired to calculate or generate an updated disturbance profile identification. Operation 306 may further include changing position signals of the LPOS from a time domain to a frequency domain. The updated disturbance profile identification may be further used to generate a peak filter array that can be stored in a look-up table, such as with the calculated servo parameters, and the table may be stored in memory. The applied filter that is used to create disturbance profile is based on known parameters of the tape drive, such as the speed and radius of the reels, the rotation frequency, harmonics, the tape length, and the tape thickness. The applied filter that is used to create disturbance profile may be a band pass filter, a low pass filter, or a high pass filter, for example.

Figures 4, 5:
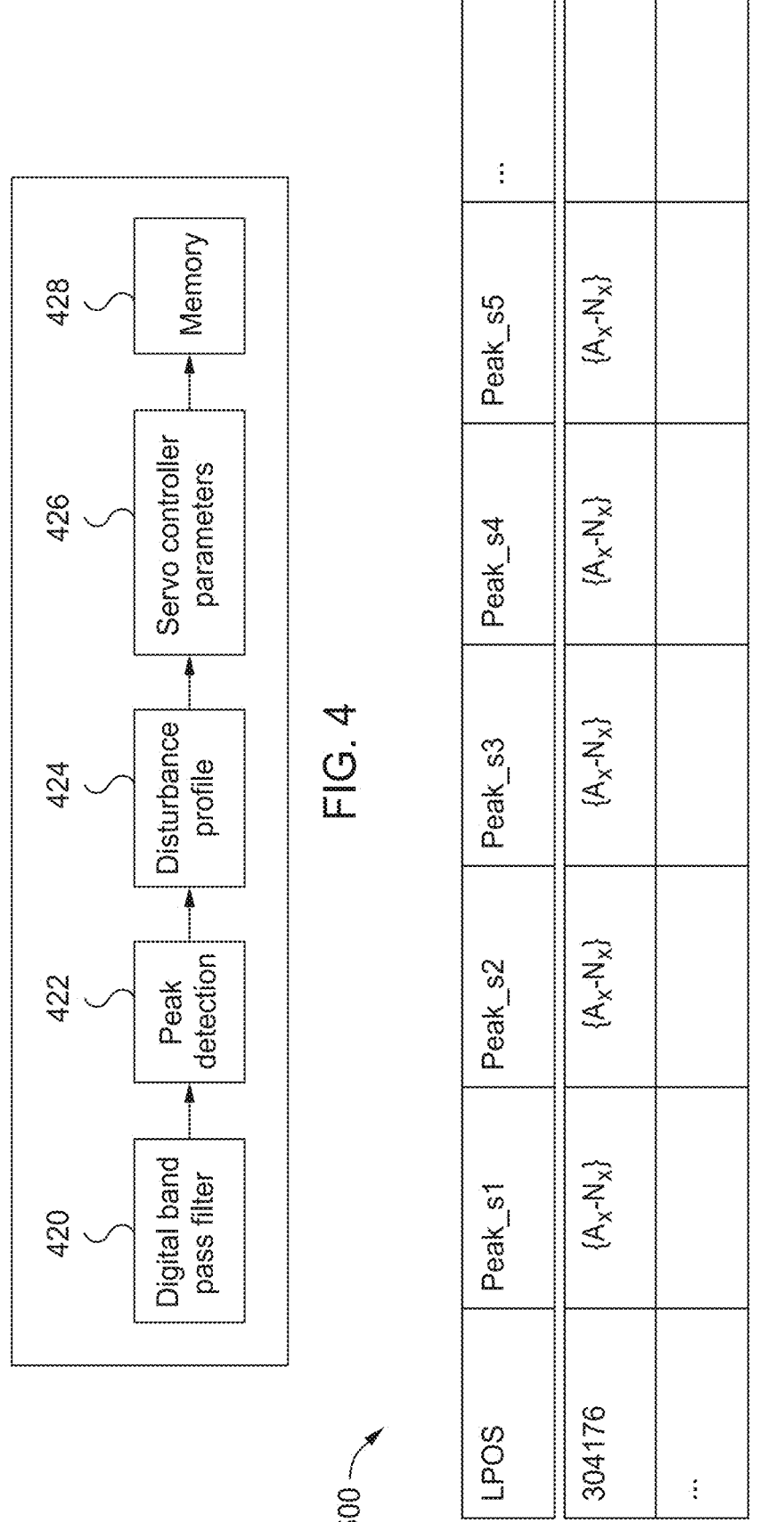
FIG. 4 illustrates a system on a chip (SoC), an integrated circuit (IC), or a field-programmable gate array (FPGA) utilized in the method of FIG. 3A, according to one embodiment.
FIG. 5 illustrates an exemplary table comprising the peak filter array generated in the method of FIG. 3A, according to one embodiment.

FIG. 4 illustrates a process flow of a system on a chip (SoC), an integrated circuit (IC), or a field-programmable gate array (FPGA) utilized in the operations 304-308 of the method 300 of FIG. 3A, according to one embodiment. For simplicity, the SoC, IC, or FGPA will be referred to herein as circuit 400 or processor 400. The circuit 400 is used to implement aspects of the method 300. The circuit 400 is configured to use a filter 420 to acquire additional information of a disturbance that can be used to generate peak detection 422, from which a disturbance profile of the detected disturbance points 424 is created, leading to the generation of servo controller parameters 426, which enables the tape drive's servo control system to be tailored to the dynamic disturbances, and to store the controller parameters in the memory 428 for storage of updated disturbance profile identification.

At operation 308 of method 300, the updated disturbance profile identification is used to create a peak filter array, which is a factory setting lookup table, and is based on the disturbance profile. At operation 310, the peak filter array is used to calibrate and generate instructions for the controllers of the PZT actuator 608 (shown in FIG. 6A) and/or VCM actuator(s) 654, 656 (shown in FIG. 6A) in order to move the tape head to adjust a disturbance compensation to match a frequency and an amplitude of a disturbance during write and read operations. In one embodiment, the PZT controller 600 (shown in FIGS. 6A-6B) comprises 3 peak filters 630a, 632a, 634 to help adjust the frequency, and the VCM controller 650 (shown in FIGS. 6A-6B) comprises 2 peak filters 630b, 632b to help adjust the frequency. While 2 and 3 peak filters are shown, the controllers may comprise any number of peak filters.

FIG. 5 illustrates an exemplary table 500 comprising the peak filter array generated in the method 300 of FIG. 3A, according to one embodiment. As shown, the table 500 comprises the LPOS of each disturbance point, along with one or more servo parameters and disturbance information. The servo parameters are simply represented as $(A_x\text{-}N_x)$, where x is a numeral identifying the peak filter parameters (i.e., 1-5 in the present example), and A-N represents the number of servo parameters.

Figure 6A:
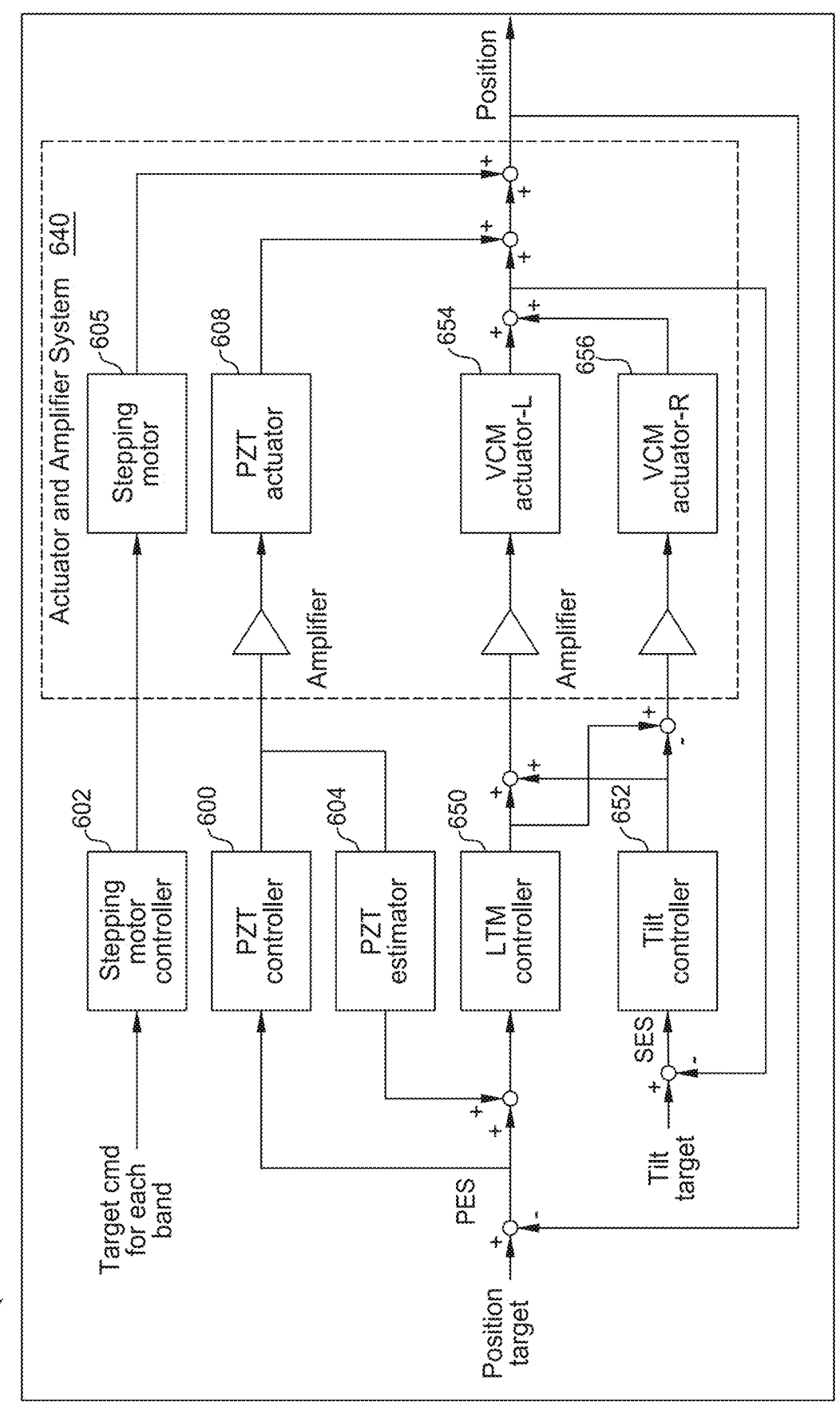
FIG. 6A illustrates a block diagram of a servo control loop of a tape head, according to one embodiment.

FIG. 6A illustrates a block diagram of a servo control loop 601 of a tape head, according to one embodiment. The servo loop 601 may be utilized with the tape drive 100 of FIGS. 1A-1C, and/or with the tape head module assembly 200 of FIG. 2.

The servo loop 601 comprises a stepping motor controller 602, a PZT controller 600, a PZT estimator 604, a LTM controller 650, which may be a VCM controller 650, a tilt controller 652, and an actuator and amplifier system 640. The actuator and amplifier system 640 comprises a stepping motor 606, a PZT actuator 608, and two VCM actuators 654, 656, where when both VCM actuators 654, 656 move upward, the tape head moves upward accordingly; when both VCM actuators 654, 656 move downward, the head moves downward. If the left VCM actuator 654 moves downward while the right VCM actuator 656 moves upwards (with a greater force or displacement), the tape head tilts toward the left side; conversely, the tape head tilts toward the right side when the right VCM actuator 656 moves downward while the left VCM actuator 654 moves upwards.

Target commands (cmd) for each band are sent the stepping motor controller 602, which then instructs the stepping motor 606 to move or re-position to target a data band. PES are input into the PZT controller 600 and the LTM controller 650. The PZT controller 606 then provides the calculated control effort to the PZT actuator 608 and the PZT estimator 604, which estimates the tape head displacement by the PZT actuator 608, and provides the estimates to the LTM controller 650.

Similarly, the LTM controller 650 and the tilt controller 652 are configured to instruct the VCM actuators 654 and 656 to move or re-position as desired based on the PES input and the estimates the displacement provided from the PZT estimator 604. The VCM actuators 654, 656 then move based on a calculated control effort, move in a cross-track direction, or tilt as needed to compensate for any LTM. The instructions provided to the stepping motor 606, the PZT actuator 608, and the VCM actuators 654, 656 are then output to correctly position the various actuators as instructed by the controllers 602, 600, 650, 652.

Figure 6B:
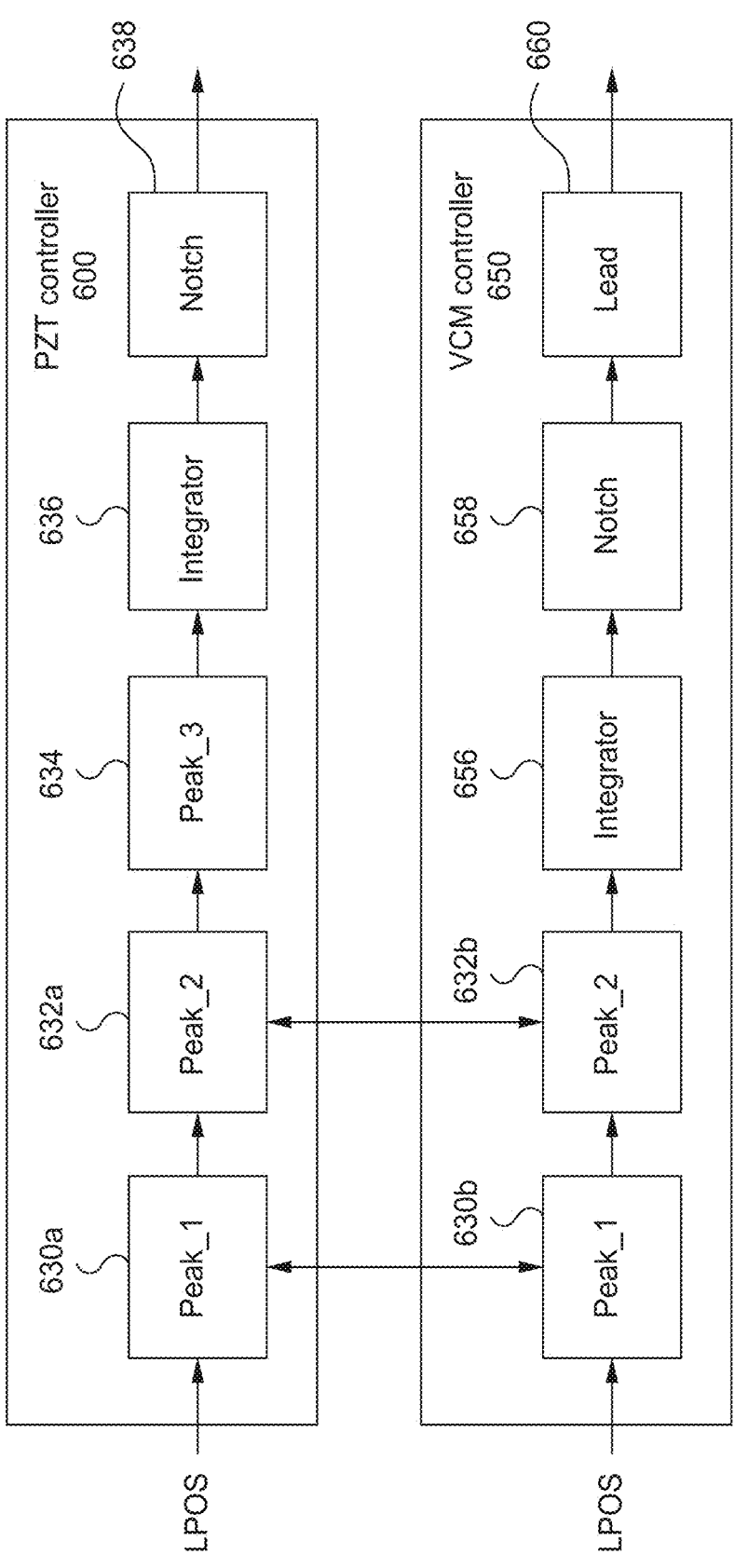
FIG. 6B illustrates the VCM controller and the PZT controller used in the method of FIG. 3A, according to one embodiment.

FIG. 6B illustrates the PZT controller 600 and the VCM controller 650 used in the output of the method 300 of FIG. 3A, according to one embodiment. The PZT controller 600 and the VCM controller 650 may be part of the servo head controller 601 of FIG. 6A. The PZT controller 600 is configured to control the PZT actuator 608 of FIG. 6A (and/or the PZT actuator 127 of FIG. 1B), and the VCM controller 650 is configured to control the VCM actuators 654, 656 of FIG. 6A (and/or the VCM actuator 125 of FIG. 1B). The PZT controller 600 comprises a first peak filter 630a, a second peak filter 632a, a third peak filter 634, an integrator 636, and a notch 638. The VCM controller 650 comprises a first peak filter 630b, a second peak filter 632b, an integrator 656, a notch 658, and a lead 660. The LPOS of the disturbance points and the peak filter array are input to the first, second, and third peak filters 630a, 632a, 634 to serve as a lookup value from which one or more output values or servo control parameters are determined in order to instruct the PZT actuator controlled by the PZT controller 600 and the VCM actuator controlled by the VCM controller 650 to individually move the tape head to adjust a disturbance compensation to match a frequency and an amplitude of a disturbance during a read or a write operation.

FIGS. 7A-7D illustrate graphs 700, 725, 750, 775 showing how the peak filter array is used to adjust the frequency and/or amplitude of the disturbances targeting the disturbance points at a frequency domain using the method 300 of FIG. 3A, according to one embodiment. In the graphs 700, 725, 750, 767, the y-axis is magnitude (mag) in dB and the x-axis is frequency in Hz.

Figures 7A, 7B:
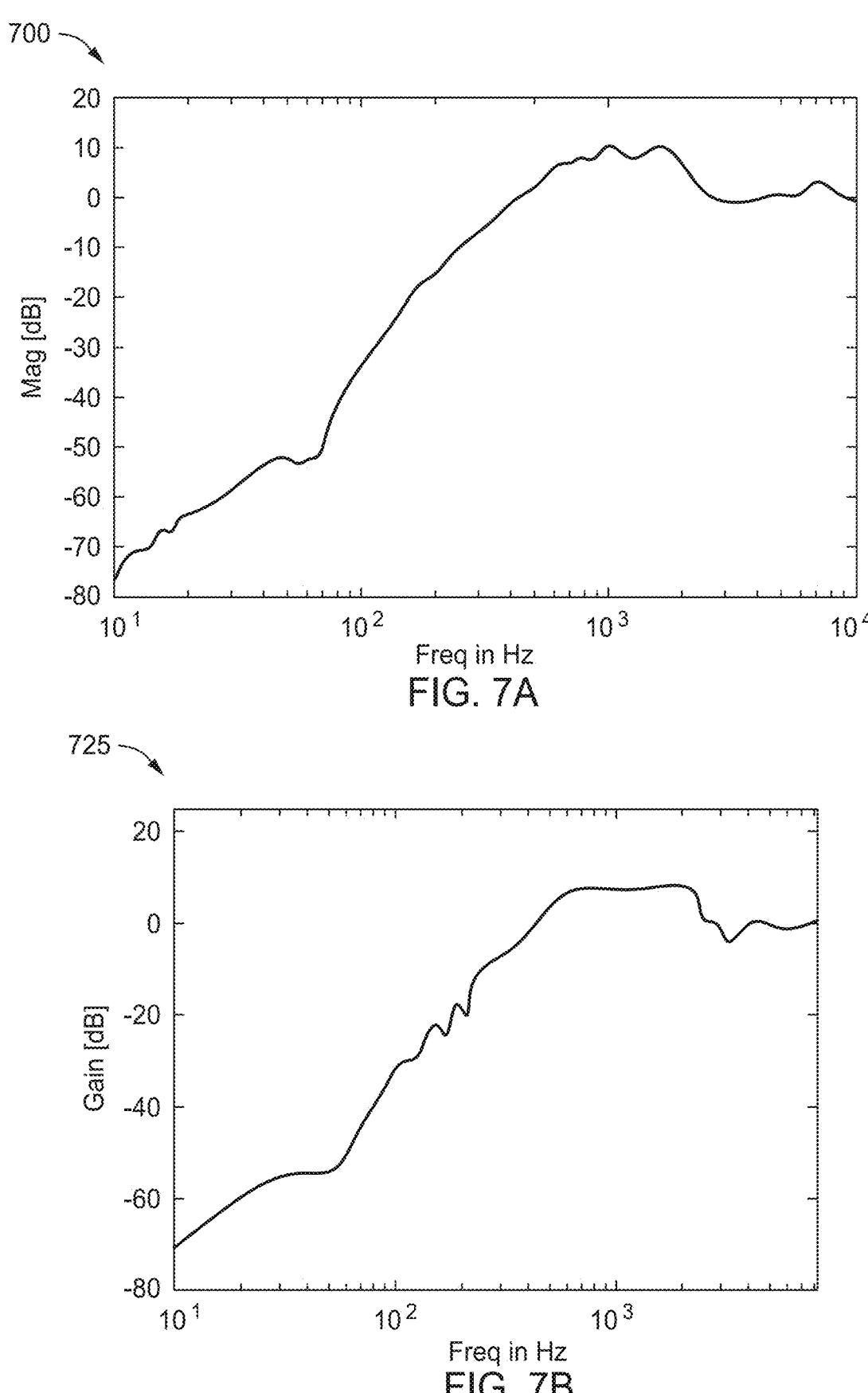
FIGS. 7A-7D illustrate graphs showing how the peak filter array is used to adjust the frequency and/or amplitude of the disturbances using the method of 3A, according to one embodiment.
Figure 7C:
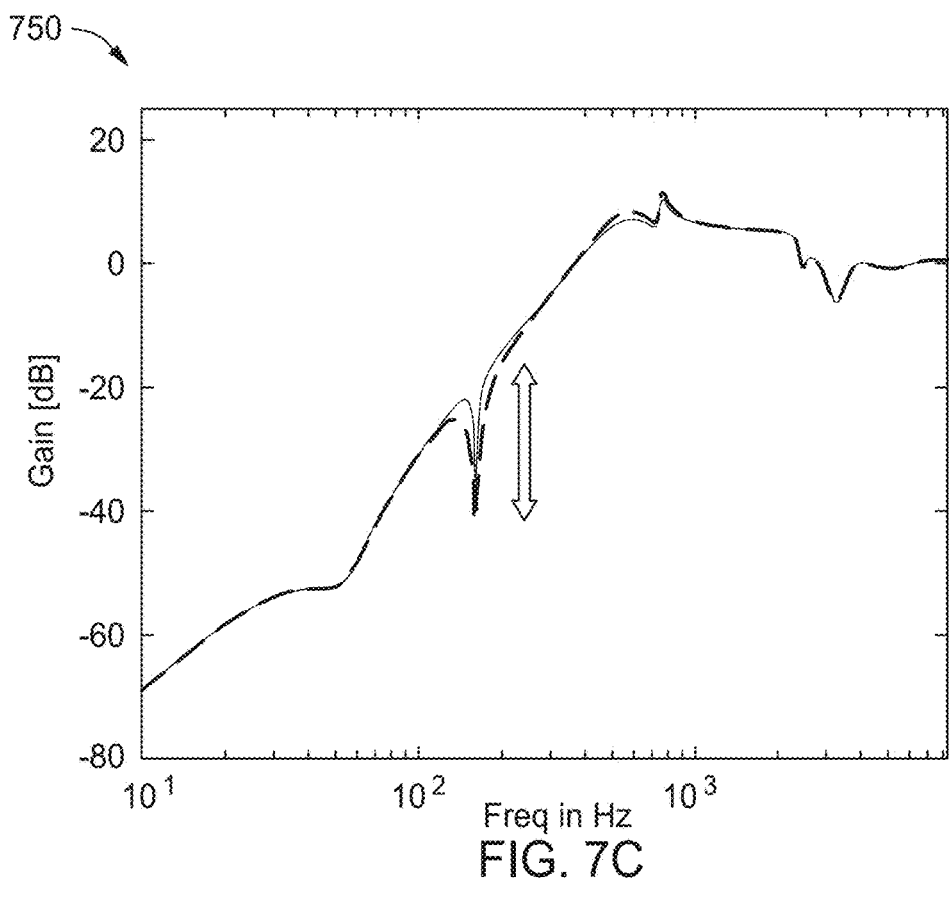
Figure 7D:
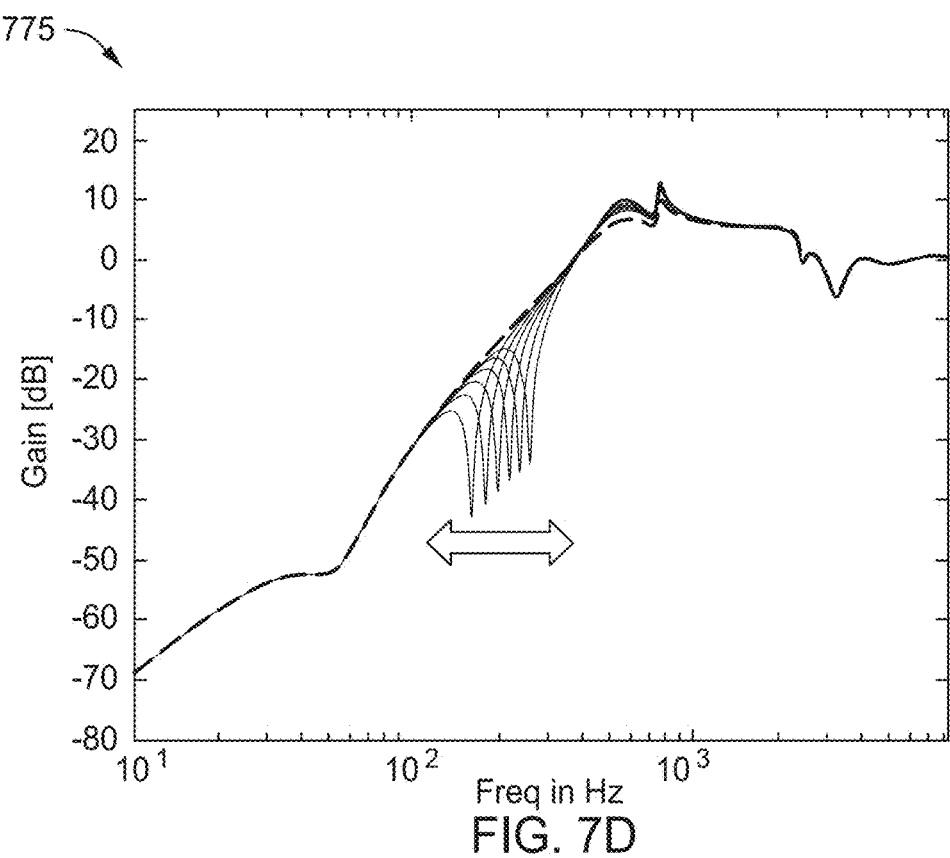

FIG. 7A illustrates a graph 700 showing the sensitivity of tape head control. FIG. 7B illustrates a graph 725 showing the peak filter array being applied to the initial or base frequency of the graph 700. FIG. 7C illustrates a graph 750 showing how the amplitude of the disturbance point is adjustable using the peak filter array of the graph 725. The arrow shown illustrates how the amplitude is adjustable along the y-axis. FIG. 7D illustrates a graph 775 showing how the frequency of the disturbance point is adjustable using the peak filter array of the graph 725. The arrow shown illustrates how the frequency is adjustable along the x-axis.

By applying the peak filter array, both the amplitude and frequency of disturbance points can be adjusted as needed to minimize the impact of the disturbance caused.

Method 350 of FIG. 3B begins at operation 302, where, prior to performing write and read operations, a reel rotation per minute (RPM) disturbance profile identification is performed, where one or more disturbance points are detected in the frequency domain along a length of a tape (i.e., from a beginning of the tape (BOT) to an end of the tape (EOT)). A position of the tape head and the tape are also decoded from the pre-written servo pattern. Position error signals (PESs) are calculated based on the difference between the position of tape head and the target position. The disturbance profile identification is used to generate a peak filter array that is stored in a table, such as the table 500 of FIG. 5, in memory 428. As stated above, methods 300 and 350 could be used in combination, and operation 302 may be the same in each method 300, 350.

Figure 8:
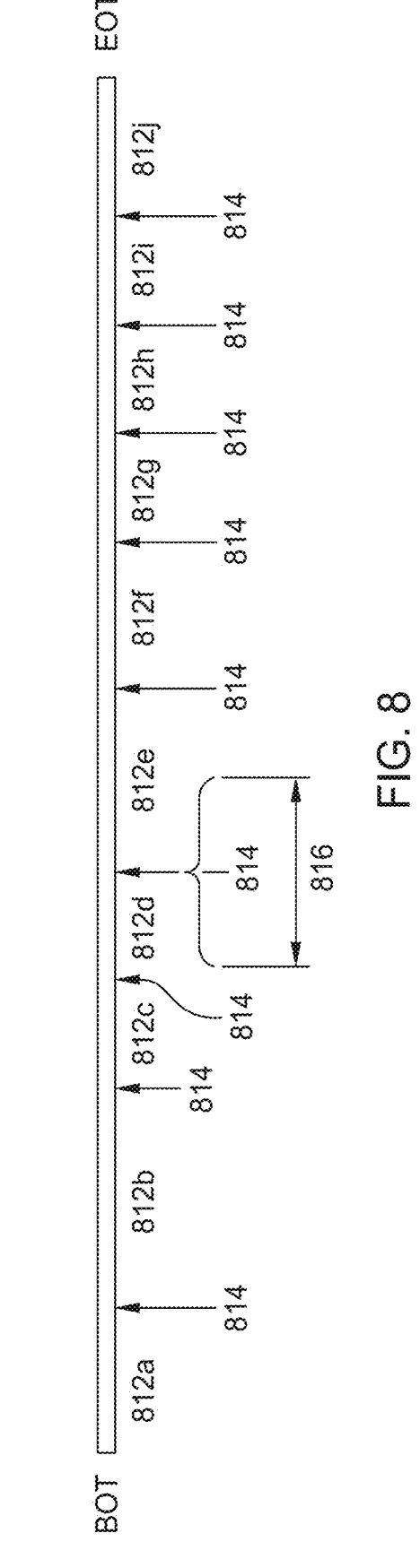
FIG. 8 illustrates a tape being partitioned into a plurality of zones, according to one embodiment.

At operation 354, the tape is partitioned longitudinally into a plurality of zones based on the size of the peak filter array created in operation 308 of FIG. 3A and on the calculated servo parameters, like shown in FIG. 8. One peak of the peak filter array corresponds to one zone. FIG. 8 illustrates a tape 800 being partitioned into a plurality of zones 812a-812j, according to one embodiment. The zones 812a-812j may have different sizes, like shown in FIG. 8, or the zones 812a-812j may all be the same size. The zones 812a-812j have range in size from about 6 mm to about 18 mm.

At operation 356, data write gaps 816 (one shown for clarity purposes) are created at each boundary 814 between each zone 812a-812j. At operation 358, servo control parameters are updated as needed when the tape head crosses each boundary 814. The servo parameters are updated based on the LPOS of the peak filters in the peak filter array within each zone 812a-812j and/or a speed of the tape. Thus, the servo control is specific to the disturbances detected within each zone 812a-812j. The servo control parameters may include tape speed, skew or tilt of the tape head, and the parameters of servo control filters of FIGS. 6A-6B. The write gaps 816 may range in size of less than about 15 mm, and the size of the write gaps 816 is based on the amount of time needed for the servo heads to be updated with the zone-specific servo parameters (i.e., a settling time of servo control). The data write gaps 816 represent write inhibit violations where data is not stored to the tape 800 due to the changing of servo parameters, as doing so may cause data written on adjacent tracks to be unintentionally overwritten.

Figure 9:
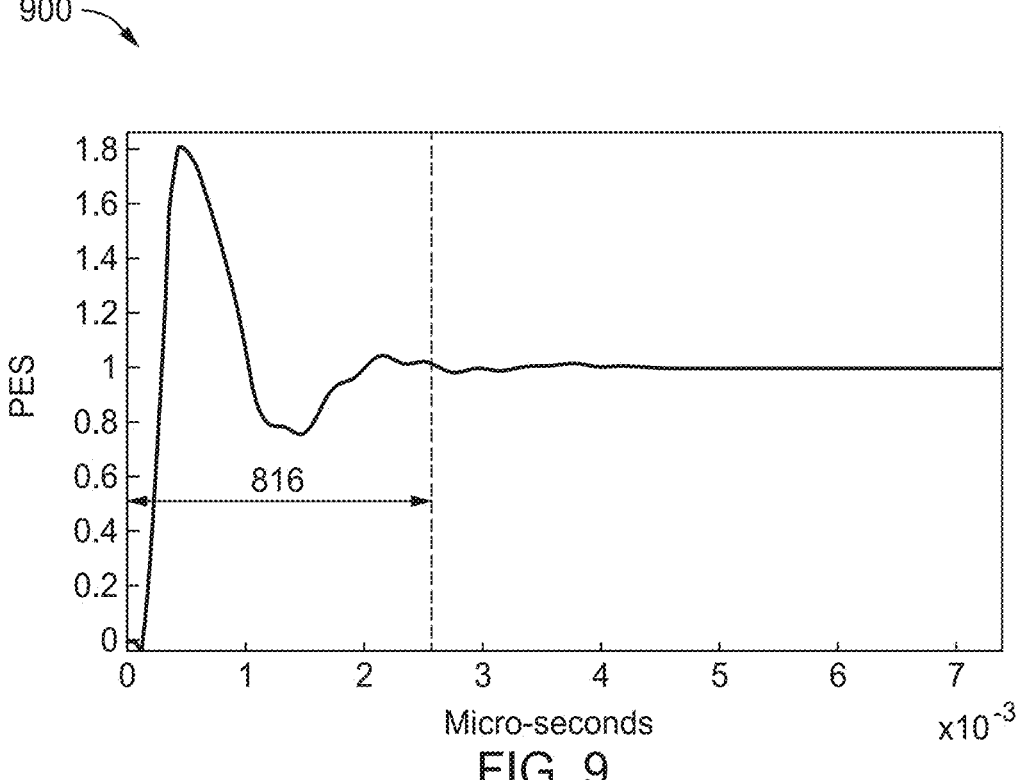
FIG. 9 illustrates a graph showing the position error signal of a tape head versus micro-seconds during a transition between the zones on the tape of FIG. 8, according to one embodiment.

FIG. 9 illustrates a graph 900 showing the position error signal (PES) of a tape head versus micro-seconds during a data write gap 816 of the tape 800 of FIG. 8, according to one embodiment.

As shown in the graph 900, the write inhibit violation of each data write gap lasts about 2 us to about 3 $\mu$s. During this time period, the PES of the tape head over the tape 800 varies greatly while the tape head is being updated with the zone-specific servo parameters. As such, data is not written to the tape 800 where data write gaps 816 occur to preserve data written on adjacent tracks of the tape 800.

In some embodiments, a memory device 428 (shown in FIG. 4) stores the LPOS of each write gap 816. The processor 400 is further configured to compare a current LPOS of tape head to the LPOS of each write gap 816 to update the servo control parameters. The servo controller 426 is then able to update the servo parameters based on the comparison of LPOS.

By utilizing the methods described above, the dynamic LTM of the tape drive can be reduced, resulting in a higher track density being achieved. As such, the track-following performance of the tape drive is improved. Furthermore, more data can be written to the tape.

In one embodiment, a tape drive comprises a take-up reel and a cartridge reel configured to have a tape coupled thereto, a tape head configured to write data to and read data from the tape, a first actuator, a second actuator, the first and second actuators each configured to actuate the tape head, and a processor configured to: perform a reel rotation per minute (RPM) disturbance profile identification detecting one or more disturbance points in the frequency domain of a position error signal (PES) along a length of a tape, acquire exact information of the disturbance points by applying a filter, acquire a longitudinal position (LPOS), frequency, and magnitude of the one or more disturbance points to create an updated disturbance profile identification of the disturbance points, use the updated disturbance profile identification to generate a peak filter array, the peak filter array being based off of the calculated servo parameters, and use the peak filter array to assist in instructing one or more of the first actuator and the second actuator to move the tape head to adjust a disturbance compensation to match a frequency and an amplitude of a disturbance during a read operation or a write operation.

The updated disturbance profile identification is based on a speed of the tape, a radius of the take-up and cartridge reels, a length of the tape, and a thickness of the tape. The reel RPM disturbance profile identification is performed in a factory setting. The reel RPM disturbance profile identification is performed one or more times at different tape speeds. The tape drive further comprises memory, wherein the peak filter array is stored in the memory. The tape drive further comprises a first actuator controller and a second actuator controller. The first actuator controller and the second actuator controller each individually comprise two or more peak filters used to adjust a disturbance compensation to match a frequency and an amplitude of a disturbance. The first actuator is a voice coil motor actuator and the second actuator is a piezoelectric (PZT) actuator.

In another embodiment, a tape drive comprises a take-up reel and a cartridge reel configured to have a tape coupled thereto, a tape head configured to write data to and read data from the tape, a first actuator, a second actuator, the first and second actuators each configured to actuate the tape head, and a processor coupled to the tape head, the processor servo controller parameters, wherein the processor is configured to: perform a reel rotation per minute (RPM) disturbance profile identification detecting one or more disturbance points in a frequency domain of position error signal (PES), along a length of a tape, partition the tape longitudinally into a plurality of zones based on a peak filter array, wherein one peak of the peak filter array corresponds to one zone, create data write gaps at the boundaries between each of the zones, and update servo control parameters when the tape head crosses each boundary when writing data to or reading data from the tape, the updated servo parameters being based on the peak filter array and the LPOS.

The tape drive further comprises a servo controller. The servo controller comprises the updated servo parameters. The processor is further configured to a longitudinal position (LPOS), frequency, and magnitude of the one or more disturbance points to create an updated disturbance profile identification of the disturbance points, and use the updated disturbance profile identification to generate a peak filter array, the peak filter array being based off of the calculated servo parameters. The reel RPM disturbance profile identification is performed in a factory setting, and wherein the reel RPM disturbance profile identification is performed one or more times at different tape speeds. One or more of the plurality of zones have a different size. The processor is configured to compare a current longitudinal position (LPOS) of the tape head to the LPOS of each peak in the peak filter array calculated detected to update the servo control parameters. The first actuator is a voice coil motor actuator and the second actuator is a piezoelectric (PZT) actuator.

In yet another embodiment, a tape drive comprises a take-up reel and a cartridge reel configured to have a tape coupled thereto, a tape head configured to write data to and read data from the tape, a first actuator, a second actuator, the first and second actuators each configured to actuate the tape head, and a processor coupled to the tape head, the processor comprising servo controller parameters, wherein the processor is configured to: perform a reel rotation per minute (RPM) disturbance profile identification detecting one or more disturbance points in a frequency domain of position error signal (PES) along a length of a tape, acquire exact information of the disturbance points by applying a filter, acquire the longitudinal position (LPOS), frequency, and magnitude of the one or more disturbance points to create an updated disturbance profile identification, use the updated disturbance profile identification to create a peak filter array, use the peak filter array to assist in instructing one or more of the first actuator and the second actuator to move the tape head to adjust a disturbance compensation to match a frequency and an amplitude of a disturbance during a read operation or a write operation, partition the tape longitudinally into a plurality of zones based on a size of the peak filter array, create data write gaps at the boundaries between each of the zones, and update servo control parameters when the tape head crosses each boundary when writing data to or reading data from the tape, the updated servo parameters being based on the calculated peak filter array.

The updated disturbance profile identification is based on a speed of the tape, a radius of the take-up and cartridge reels, a length of the tape, and a thickness of the tape. The reel RPM disturbance profile identification is performed in a factory setting, and wherein the reel RPM disturbance profile identification is performed one or more times at different tape speeds. One or more of the plurality of zones have a different size, and wherein a servo controller of the tape drive is configured to compare a current longitudinal position (LPOS) of the tape head to the LPOS of each peak of the peak filter array detected to update the servo control parameters. The tape drive further comprises memory. The peak filter array is stored in the memory. The first actuator controller and the second actuator controller each individually comprise two or more peak filters used to adjust a disturbance compensation to match a frequency and an amplitude of a disturbance. The first actuator is a voice coil motor actuator and the second actuator is a piezoelectric (PZT) actuator.

While the foregoing is directed to embodiments of the present disclosure, other and further embodiments of the disclosure may be devised without departing from the basic scope thereof, and the scope thereof is determined by the claims that follow.

What is claimed is:
1. A tape drive, comprising:
 a take-up reel and a cartridge reel configured to have a tape coupled thereto;

13 a tape head configured to write data to and read data from the tape;

a first actuator and a second actuator, each configured to actuate the tape head; and a processor configured to:

perform a reel rotation per minute (RPM) disturbance profile identification detecting one or more disturbance points in a frequency domain of position error signal (PES) along a length of a tape;

acquire exact information of the disturbance points by applying a filter;

acquire a longitudinal position (LPOS), frequency, and magnitude of the one or more disturbance points to create an updated disturbance profile identification;

use the updated disturbance profile identification to generate a peak filter array; and use the peak filter array to assist in instructing one or more of the first actuator and the second actuator that are configured to move the tape head, to adjust a disturbance compensation to match a frequency and an amplitude of a disturbance during a read operation or a write operation.

2. The tape drive of claim 1, wherein the updated disturbance profile identification is based on a speed of the tape, a radius of the take-up and cartridge reels, a length of the tape, and a thickness of the tape.

3. The tape drive of claim 1, wherein the reel RPM disturbance profile identification is performed in a factory setting.

4. The tape drive of claim 1, wherein the reel RPM disturbance profile identification is performed one or more times at different tape speeds.

5. The tape drive of claim 1, further comprising memory, wherein the peak filter array is stored in the memory.

6. The tape drive of claim 1, further comprising a first actuator controller and a second actuator controller, wherein the first actuator controller and the second actuator controller each individually comprise two or more peak filters used to adjust a disturbance compensation to match a frequency and an amplitude of a disturbance.

7. The tape drive of claim 1, wherein the first actuator is a voice coil motor actuator and the second actuator is a piezoelectric (PZT) actuator.

8. A tape drive, comprising:

a take-up reel and a cartridge reel configured to have a tape coupled thereto;

a tape head configured to write data to and read data from the tape;

a first actuator;

a second actuator, the first and second actuators each being configured to actuate the tape head; and a processor coupled to the tape head, the processor comprising servo controller parameters, wherein the processor is configured to:

perform a reel rotation per minute (RPM) disturbance profile identification detecting one or more disturbance points in a frequency domain of position error signal (PES) along a length of a tape;

partition the tape longitudinally into a plurality of zones based on a size of a peak filter array, wherein one peak filter in the peak filter array corresponds to one zone;

create data write gaps at the boundaries between each of the zones; and update the servo control parameters when the tape head crosses each boundary when writing data to or reading data from the tape, the updated servo control parameters being based on the peak filter array and a longitudinal position (LPOS) of the disturbances.

9. The tape drive of claim 8, further comprising a servo controller, wherein the servo controller comprises the updated servo control parameters.

10. The tape drive of claim 8, wherein the processor is further configured to:

acquire the LPOS, frequency, and magnitude of the one or more disturbance points to create an updated disturbance profile identification; and use the updated disturbance profile identification to generate the peak filter array, the peak filter array being based off of the calculated servo control parameters.

11. The tape drive of claim 8, wherein the reel RPM disturbance profile identification is performed in a factory setting.

12. The tape drive of claim 8, wherein the reel RPM disturbance profile identification is performed one or more times at different tape speeds.

13. The tape drive of claim 8, wherein one or more of the plurality of zones have a different size.

14. The tape drive of claim 8, wherein the processor is configured to compare a current LPOS of the tape head to the LPOS of the peak filter array calculated to update the servo control parameters.

15. The tape drive of claim 8, wherein the first actuator is a voice coil motor actuator and the second actuator is a piezoelectric (PZT) actuator.

16. A tape drive, comprising:

a take-up reel and a cartridge reel configured to have a tape coupled thereto;

a tape head configured to write data to and read data from the tape;

a first actuator;

a second actuator, the first and second actuators each being configured to actuate the tape head; and a processor coupled to the tape head, the processor comprising servo controller parameters, wherein the processor is configured to:

perform a reel rotation per minute (RPM) disturbance profile identification detecting one or more disturbance points in a frequency domain of position error signal (PES) along a length of a tape;

acquire exact information of the disturbance points by applying a filter;

acquire a longitudinal position (LPOS), frequency, and magnitude of the one or more disturbance points to create an updated disturbance profile identification;

use the updated disturbance profile identification to create a peak filter array;

use the peak filter array to assist in instructing one or more of the first actuator and the second actuator that are configured to move the tape head, to adjust a disturbance compensation to match a frequency and an amplitude of a disturbance during a read operation or a write operation;

partition the tape longitudinally into a plurality of zones based on a size of the peak filter array;

create data write gaps at the boundaries between each of the zones; and update the servo control parameters when the tape head crosses each boundary when writing data to or reading data from the tape, the updated servo parameters being based on the calculated peak filter array.

17. The tape drive of claim 16, wherein the updated disturbance profile identification is based on a speed of the tape, a radius of the take-up and cartridge reels, a length of the tape, and a thickness of the tape.

18. The tape drive of claim 16, wherein the reel RPM disturbance profile identification is performed in a factory setting, and wherein the reel RPM disturbance profile identification is performed one or more times at different tape speeds.

19. The tape drive of claim 16, wherein one or more of the plurality of zones have a different size, and wherein a servo controller of the tape drive is configured to compare a current LPOS of the tape head to the LPOS of each peak of the peak filter array detected to update the servo control parameters.

20. The tape drive of claim 16, further comprising memory.

21. The tape drive of claim 20, wherein the peak filter array is stored in the memory.

22. The tape drive of claim 16, further comprising a first actuator controller and a second actuator controller, wherein the first actuator controller and the second actuator controller each individually comprise two or more peak filters used to adjust a disturbance compensation to match a frequency and an amplitude of a disturbance.

23. The tape drive of claim 16, wherein the first actuator is a voice coil motor actuator and the second actuator is a piezoelectric (PZT) r actuator.

* * * * *